United States Patent
Aso et al.

(10) Patent No.: US 7,960,486 B2
(45) Date of Patent: *Jun. 14, 2011

(54) PROCESS FOR PRODUCING OLEFIN POLYMER

(75) Inventors: Yuki Aso, Yokohama (JP); Noriyuki Satou, Kisarazu (JP); Shin-ichi Kumamoto, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/534,311

(22) Filed: Aug. 3, 2009

(65) Prior Publication Data

US 2010/0036076 A1    Feb. 11, 2010

(30) Foreign Application Priority Data

Aug. 8, 2008 (JP) ................ 2008-205263

(51) Int. Cl.
  *C08F 2/38* (2006.01)
  *C08F 4/44* (2006.01)
  *C07C 2/74* (2006.01)

(52) U.S. Cl. .......... 526/82; 526/115; 526/141; 526/905; 585/255

(58) Field of Classification Search .......... 526/905, 526/78, 86
  See application file for complete search history.

(56) References Cited

U.S. PATENT DOCUMENTS

| 4,851,488 A | * | 7/1989 | Burstain | 526/78 |
| 6,288,178 B1 | * | 9/2001 | Jacobsen | 526/67 |
| 2010/0036070 A1 | * | 2/2010 | Aso et al. | 526/170 |

FOREIGN PATENT DOCUMENTS

| JP | 8-151408 A | | 6/1996 |
| JP | 10-204123 A | | 8/1998 |
| JP | 10204123 A | * | 8/1998 |

* cited by examiner

*Primary Examiner* — David Wu
*Assistant Examiner* — Elizabeth Eng
(74) *Attorney, Agent, or Firm* — Sughrue Mion, PLLC

(57) ABSTRACT

The purpose of the present invention is provite a process for producing an olefin polymer, which can produce an olefin polymer having a higher molecular weight even in the presence of hydrogen and can obtain an olefin polymer having good powder characteristics by lowering hydrogen concentration efficiently in polymerizing an olefin in the presence of hydrogen by use of a gas phase reaction vessel. There is provided a process for producing an olefin polymer comprising the steps of: using a gas phase reaction vessel; polymerizing an olefin by use of a catalyst for olefin polymerization in the presence of hydrogen; adding a hydrogenation catalyst into the gas phase reaction vessel; and adding a polymerization activity depressant.

8 Claims, No Drawings

PROCESS FOR PRODUCING OLEFIN POLYMER

FIELD OF THE INVENTION

The present invention relates to a process for producing an olefin polymer.

BACKGROUND OF THE INVENTION

Heretofore, in a process for producing an olefin polymer by use of gas phase polymerization reaction in the presence of hydrogen, there has been known a method for controlling hydrogen concentration within a gas phase polymerization reaction vessel, which comprises lowering hydrogen concentration within the gas phase polymerization reaction vessel by taking out a portion of a hydrogen-containing gas within the gas phase polymerization reaction vessel, then adding hydrogen in the gas taken out to an olefin to hydrotreat the gas, and thereafter feeding the hydrotreated gas again to the polymerization reaction vessel. (Refer to, for example, Patent Document 1.)

Furthermore, in a process for producing an olefin polymer in the presence of hydrogen, there has been known a method for controlling molecular weight distribution or the like of the olefin polymer produced by adding a hydrogenation catalyst to a reaction vessel to lower hydrogen concentration. (Refer to, for example, Patent Document 2.)

[Patent Document 1] JP-A-10-204123
[Patent Document 2] JP-A-8-151408

BRIEF SUMMARY OF THE INVENTION

However, in the method for controlling hydrogen concentration disclosed in the above Patent Document 1, it was necessary to provide a reaction layer separately in order to use a hydrogenation catalyst, and there was the problem that clogging of the reaction layer or a circulating gas line or deterioration of catalyst performance was caused.

Furthermore, when a hydrogenation catalyst was used for gas phase polymerization as disclosed in the above Patent Document 2, there was the problem that powders of the resultant olefin polymer had tackiness and the powder characteristics were deteriorated, although an olefin polymer having a higher molecular weight could be produced in the presence of hydrogen by addition of a hydrogenation catalyst.

In view of such current situation, the purpose of the present invention resides in providing a process for producing an olefin polymer, which can produce an olefin polymer having a higher molecular weight even in the presence of hydrogen and can obtain an olefin polymer having good powder characteristics by lowering hydrogen concentration efficiently in polymerizing an olefin in the presence of hydrogen by use of a gas phase reaction vessel.

The present inventors have found that by having a step of adding a hydrogenation catalyst into the gas phase reaction vessel and a step of adding a polymerization activity depressant in a process for producing an olefin polymer, which comprises using a gas phase reaction vessel and polymerizing an olefin by use of a catalyst for olefin polymerization in the presence of hydrogen, hydrogen concentration can be lowered efficiently, an olefin polymer having a higher molecular weight can be produced even in the presence of hydrogen, and an olefin polymer having good powder characteristics can be produced, and have led to accomplishment of the present invention.

That is, the present invention relates to a process for producing an olefin polymer comprising the steps of:
using a gas phase reaction vessel;
polymerizing an olefin by use of a catalyst for olefin polymerization in the presence of hydrogen;
adding a hydrogenation catalyst into the gas phase reaction vessel; and
adding a polymerization activity depressant.

ADVANTAGES OF THE INVENTION

By the process for producing an olefin polymer of the present invention, hydrogen concentration can be lowered efficiently, an olefin polymer having a higher molecular weight can be produced even in the presence of hydrogen, and an olefin polymer having good powder characteristics can be produced

DETAILED DESCRIPTION OF THE INVENTION

Hereinafter, the present invention is explained in more detail.

The process for producing an olefin polymer of the present invention is characterized by having a step of adding a hydrogenation catalyst into the gas phase reaction vessel and a step of adding a polymerization activity depressant in a process for producing an olefin polymer, which comprises using a gas phase reaction vessel and polymerizing an olefin by use of a catalyst for olefin polymerization in the presence of hydrogen.

[Hydrogenation Catalyst]

The hydrogenation catalyst used in the present invention is a catalyst having capability to hydrogenate selectively olefinic unsaturated double bonds, and hydrogen present in a gas phase reaction vessel reacts with an olefin such as propylene, ethylene or the like and is removed as propane or ethane. As a hydrogenation catalyst, there are cited publicly known hydrogenation catalysts. There are cited, for example, compounds containing titanium, platinum, palladium, palladium-chromium, nickel, or ruthenium, and concretely (a) the above metals, (b) oxides of the above metals, (c) halides of the above metals, (d) compounds wherein the above (a), (b), (c) or the like are supported on a porous carrier such as silica or alumina, and the like.

The compound containing nickel includes, for example, bis(1,5-cyclooctadiene)nickel, bis(cyclopentadienyl)nickel, tetrakis(diethylphenylphosphonite)nickel, tetrakis(methyldiphenylphosphine)nickel, tetrakis(trifluorophosphine)nickel, and the like.

The compound containing titanium includes titanocene compounds having as a ligand at least one kind selected from the group consisting of cyclopentadienyl group, indenyl group, fluorenyl group, and their derivatives, and non-titanocene compounds having as a ligand at least one kind selected from the group consisting of dialkylamino group, alkoxy group, phenoxy group, aryloxy group, thioalkoxy group, thioaryloxy group, alkylamino group, arylamino group, alkylphosphino group, arylphosphino group, a group represented by the undermentioned general formula [1], a group represented by the undermentioned general formula [2], and their derivatives.

$$R^1_3P=N— \qquad [1]$$

In the formula, $R^1$ stands for hydrogen atom, halogen atom, hydrocarbon group, halogenated hydrocarbon group, hydrocarbon oxy group, silyl group, or amino group, three $R^1$'s may be same or different one another, and two or more of them may be bonded together or may form a ring.

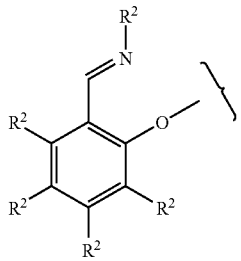

[2]

In the formula, $R^2$ stands for hydrogen atom, halogen atom, or hydrocarbon group, plural $R^2$s may be same or different one another, and two or more of them may be bonded together or may form a ring.

Compounds wherein the above (a), (b), (c) or the like are supported on a porous carrier such as silica or alumina includes, for example, $Pd/Al_2O_3$, $Pd/SiO_2.Al_2O_3$, $Pd/SiO_2$, $Pt/Al_2O_3$, and the like.

Among them, a titanocene compound is preferable. As the titanocene compound, there are cited, for example, bis(cyclopentadienyl)titanium dichloride, bis(cyclopentadienyl)titanium dibromide, bis(cyclopentadienyl)titanium diiodide, bis(cyclopentadienyl)titanium difluoride, bis(cyclopentadienyl)titanium chlorbromide, bis(cyclopentadienyl)titanium methoxychloride, bis(cyclopentadienyl)titanium ethoxychloride, bis(cyclopentadienyl)titanium phenoxychloride, bis(cyclopentadienyl)titanium dimethoxide, and the like.

Furthermore, as the hydrogenation catalysts used in the present invention, preferable are those which are liquid or in the state of being soluble in a solvent.

Moreover, the hydrogenation catalyst used in the present invention may be used in combination with a reducing agent. As the reducing agent, there can be cited, for example, organic aluminum compound, organic lithium compound, organic magnesium compound, organic zinc compound, and the like. Among them, preferable is use in combination with an organic aluminum compound.

The above organic aluminum compound includes, for example, trialkyl aluminum, alkyl aluminum halide, alkyl aluminum hydride, aluminum alkoxide, almoxane, and the like.

A trialkyl aluminum includes, for example, trimethyl aluminum, triethyl aluminum, triisobutyl aluminum, trihexyl aluminum, trioctyl aluminum, tridecyl aluminum, and the like.

An alkyl aluminum halide includes, for example, diethyl aluminum monochloride, diisobutyl aluminum monochloride, ethyl aluminum sesquichloride, ethyl aluminum dichloride, and the like.

An alkyl aluminum hydride includes, for example, diethyl aluminum hydride, diisobutyl aluminum hydride, and the like.

An aluminum alkoxide includes, for example, diethyl aluminum ethoxide, diethyl aluminum phenoxide, and the like.

An almoxane includes, for example, methyl almoxane, ethyl almoxane, isobutyl almoxane, methylisobutyl almoxane, and the like.

Among them, a trialkyl aluminum is preferable, and triethyl aluminum is more preferable.

They may be used singly or in a combination of two or more kinds.

The molar ratio of a reducing agent and a metal atom in a hydrogenation catalyst is preferably 1:1 to 30:1, more preferably 2:1 to 10:1, and further more preferably 3:1 to 7:1.

A hydrogenation catalyst can be fed after diluted with an inert organic solvent. In so doing, the hydrogenation catalyst may be contacted with a reducing agent in advance. The above inert organic solvent means a solvent that does not react with any material participating in hydrogenation reaction. As a preferable solvent, there are cited aliphatic hydrocarbons such as butane, pentane, hexane, heptane, octane and the like, and the isomers thereof, and cycloaliphatic hydrocarbons such as cyclohexane, cycloheptane and the like, and the derivatives thereof.

The hydrogenation catalyst used in the present invention is preferably a material containing a titanocene compound, more preferably a compound formed by contacting a titanocene compound and a reducing agent, and further more preferably a compound formed by contacting a titanocene compound and an organic aluminum compound.

[Polymerization Activity Depressant]

The polymerization activity depressant used in the present invention has the action of depressing that by charging a hydrogenation catalyst the resultant olefin polymer powders have tackiness and the powder characteristics are deteriorated.

The polymerization activity depressant used herein includes, for example, an electron-donating compound, an active hydrogen-containing compound, and an oxygen-containing compound gaseous at normal temperatures and normal pressures, and the depressant generally has the action of lowering the activity of an olefin polymerization catalyst.

The electron-donating compound includes alkoxysilanes, esters, ethers, and the like.

The active hydrogen-containing compound includes alcohols, water, and the like.

The oxygen-containing compound gaseous at normal temperatures and normal pressures includes oxygen, carbon monoxide, carbon dioxide, and the like.

The alkoxysilanes include tetrabutoxysilane, tetraethoxysilane, tetramethoxysilane, and the like.

The alcohols include methanol, ethanol, propanol, butanol, and the like.

The polymerization activity depressant is preferably an active hydrogen-containing compound or an oxygen-containing compound gaseous at normal temperatures and normal pressures, is more preferably alcohols, oxygen or carbon monoxide, and is further preferably methanol, ethanol, propanol, butanol, oxygen or carbon monoxide.

Polymerization activity depressants may be used singly or in a combination of two or more kinds.

The amount of a polymerization activity depressant added can be selected appropriately in accordance with effects, but should be adjusted so as not to disturb polymerization reaction or hydrogenation reaction more remarkably than necessary. The depressant may be charged in a reaction vessel continuously or intermittently. In addition, the depressant may be charged as such or may be charged after diluted with an organic solvent inert to polymerization reaction or hydrogenation reaction.

[Catalyst for Olefin Polymerization]

As the catalyst for olefin polymerization used in the present invention, there can be used publicly known polymerization catalysts used for olefin polymerization, and there can be cited Ziegler-Natta catalysts, which are disclosed in, for example, JP-A-57-63310, JP-A-58-83006, JP-A-61-78803, JP-A-7-216017, JP-A-10-212319, JP-A-62-158704, and JP-A-11-92518, or metallocene type catalysts, which are disclosed in JP-A-5-155930, JP-A-9-143217, JP-A-2002-293817, JP-A-2003-171412, JP-A-8-511044, and JP-A-2001-31720.

Ziegler-Natta catalysts are preferably materials formed by contacting the undermentioned component (a) and the undermentioned component (b), and more preferably materials formed by contacting the undermentioned component (a), the undermentioned component (b), and the undermentioned component (c): component (a): a solid component containing titanium, magnesium and a halogen,
component (b): an organic aluminum compound, and component (c): an electron-donating compound.

As examples of a method for preparing the solid component (a) containing titanium, magnesium and a halogen, there can be shown the following methods (1) to (5):
(1) a method of contacting a halogenated magnesium compound and a titanium compound,
(2) a method of contacting a halogenated magnesium compound, an electron donor, and a titanium compound,
(3) a method of dissolving a halogenated magnesium compound and a titanium compound in an electron-donating solvent to obtain a solution and then impregnating the solution into a carrier material,
(4) a method of contacting a dialkoxy magnesium compound, a halogenated titanium compound, and an electron donor, and
(5) a method of contacting a solid component containing magnesium atom, titanium atom, and a hydrocarbon oxy group, a halogenated compound, and an electron donor and/or an organic acid halide.

Among them, the solid component obtained by the method of (5) is preferable, and the solid component containing a phthalic acid ester compound as an electron donor is more preferable.

An organic aluminum compound of component (b) includes, for example, trialkyl aluminum, alkyl aluminum halide, alkyl aluminum hydride, aluminum alkoxide, almoxane, and the like.

A trialkyl aluminum includes, for example, trimethyl aluminum, triethyl aluminum, triisobutyl aluminum, trihexyl aluminum, trioctyl aluminum, tridecyl aluminum, and the like.

An alkyl aluminum halide includes, for example, diethyl aluminum monochloride, diisobutyl aluminum monochloride, ethyl aluminum sesquichloride, ethyl aluminum dichloride, and the like.

An alkyl aluminum hydride includes, for example, diethyl aluminum hydride, diisobutyl aluminum hydride, and the like.

An aluminum alkoxide includes, for example, diethyl aluminum ethoxide, diethyl aluminum phenoxide, and the like.

An almoxane includes, for example, methyl almoxane, ethyl almoxane, isobutyl almoxane, methylisobutyl almoxane, and the like.

Among them, a trialkyl aluminum is preferable, and triethyl aluminum is more preferable.

They may be used singly or in a combination of two or more kinds.

As an electron-donating compound of component (c), there is preferably used a silicon compound represented by the following general formula [3]:

$R^3{}_r Si(OR^4)_{4-r}$      [3]

wherein $R^3$ stands for hydrogen atom, a hydrocarbon group having 1 to 20 carbon atoms, or a hetero atom-containing group, $R^4$ stands for a hydrocarbon group having 1 to 20 carbon atoms, and r stands for an integer of 0 to 3, and when plural $R^3$ are present, plural $R^3$ may be respectively same or different, and when plural $R^4$ are present, plural $R^4$ may be respectively same or different.

A hydrocarbon group having 1 to 20 carbon atoms of $R^3$ includes, for example, straight chain alkyl group having 1 to 20 carbon atoms, branched chain alkyl group having 1 to 20 carbon atoms, cycloalkyl group having 1 to 20 carbon atoms, cycloalkenyl group having 1 to 20 carbon atoms, aryl group having 1 to 20 carbon atoms, and the like.

A straight chain alkyl group having 1 to 20 carbon atoms includes, for example, methyl group, ethyl group, propyl group, butyl group, pentyl group, and the like.

A branched chain alkyl group having 1 to 20 carbon atoms includes, for example, isopropyl group, sec-butyl group, tert-butyl group, tert-amyl group, and the like.

A cycloalkyl group having 1 to 20 carbon atoms includes, for example, cyclopentyl group, cyclohexyl group, and the like.

A a cycloalkenyl group having 1 to 20 carbon atoms includes, for example, cyclopentenyl group, and the like.

An aryl group having 1 to 20 carbon atoms includes, for example, phenyl group, tolyl group, and the like.

A hetero atom-containing group of $R^3$ includes, for example, oxygen atom-containing group, nitrogen atom-containing group, sulfur atom-containing group, phosphorus atom-containing group, and the like. Specifically, there are cited dialkylamino group such as dimethylamino group, methylethylamino group, diethylamino group, ethyl-n-propylamino group, or di-n-propylamino group, pyrrolyl group, pyridyl group, pyrrolidinyl group, piperidyl group, perhydroindolyl group, perhydroisoindolyl group, perhydroquinolyl group, perhydroisoquinolyl group, perhydrocarbazolyl group, perhydroacrydinyl group, furyl group, pyranyl group, perhydrofuryl group, thienyl group, and the like. Among them, preferable is a group having a hetero atom which can bond directly to the silicon atom of a silicon compound.

A hydrocarbon group having 1 to 20 carbon atoms of $R^4$ includes those which are same as the examples shown as a hydrocarbon group having 1 to 20 carbon atoms of $R^3$.

A preferable electron-donating compound of component (c) is a silicon compound having as $R^3$ at least one hydrocarbon group having a secondary or tertiary carbon atom bonded directly to silicon atom or at least one dialkylamino group in the above-mentioned general formula [3].

Preferable concrete examples of an electron-donating compound of component (c) include diisopropyldimethoxysilane, di-tert-butyldimethoxysilane, tert-butylmethyldimethoxysilane, tert-butylethyldimethoxysilane, tert-butyl-n-propyldimethoxysilane, tert-butyl-n-butyldimethoxysilane, tert-amylmethyldimethoxysilane, tert-amylethyldimethoxysilane, tert-amyl-n-propyldimethoxysilane, tert-amyl-n-butyldimethoxysilane, isobutylisopropyldimethoxysilane, tert-butylisopropyldimethoxysilane, dicyclobutyldimethoxysilane, cyclobutylisopropyldimethoxysilane, cyclobutylisobutyldimethoxysilane, cyclobutyl-tert-butyldimethoxysilane, dicyclopentyldimethoxysilane, cyclopentylisopropyldimethoxysilane, cyclopentylisobutyldimethoxysilane, cyclopentyl-tert-butyldimethoxysilane, dicyclohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcyclopentyldimethoxysilane, diisopropyldiethoxysilane, diisobutyldiethoxysilane, di-tert-butyldiethoxysilane, tert-butylmethyldiethoxysilane, tert-butylethyldiethoxysilane, tert-butyl-n-propyldiethoxysilane, tert-butyl-n-butyldiethoxysilane, tert-amylmethyldiethoxysilane, tert-amylethyldiethoxysilane, tert-amyl-n-propyldiethoxysilane, tert-amyl-n-butyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, 2-norbornane-methyldimethoxysilane, bis(perhydroquinolino)dimethoxysilane, bis(perhydroisoquinolino)dimethoxysilane, (perhydroquinolino)(perhydroisoquinolino)dimethoxysilane, (perhydroquinolino)methyldimethoxysilane, (perhydroisoquinolino)methyldimethoxysilane, (perhydroquinolino)ethyldimethoxysilane, (perhydroisoquinolino)ethyldimethoxysilane, (perhydroquinolino)(n-propyl)dimethoxysilane, (perhydroisoquinolino)(n-propyl)dimethoxysilane, (perhydroquinolino)(tert-butyl)dimethoxysilane, (perhydroisoquinolino)(tert-butyl)dimethoxysilane, and diethylaminotriethoxysilane.

They may be used singly or in a combination of two or more kinds.

When a metallocene type catalyst is used as a catalyst for olefin polymerization, as a metallocene compound, preferable is a metallocene compound represented by the following general formula [4]:

$$Cp_nMX_{4-n} \qquad [4]$$

wherein Cp is a group selected from substituted or unsubstituted cyclopentadienyl group, indenyl group, or fluorenyl group, M is an element selected from zirconium and hafnium, X is a group selected from hydrogen, halogen, alkoxy group, amino group, alkyl group having 1 to 10 carbons, or aryloxy group, plural Cp and X may be bonded together through a crosslinking group, and n stands for an integer of 1 to 3.

[Polymerization Steps]

The process for producing an olefin polymer of the present invention can be applied to not only batch polymerization process but also continuous polymerization process. In addition, when, for example, a metallocene type catalyst is used as a catalyst for olefin polymerization, in many cases the resulting olefin polymers have unsaturated bonds at their terminals. It appears that such unsaturated bonds would be formed by dehydrogenation of the saturated terminals once produced, and therefore there is the possibility that such hydrogen would be gradually concentrated in a circulating olefin. Thus, in such a case, the present invention can be applied as a technique for controlling the hydrogen concentration in a single polymerization step.

Furthermore, in some cases the present invention is necessary also in a multistage polymerization having plural polymerization steps different in polymerization conditions. In a multistage polymerization, polymerization may be carried out by changing polymerization conditions in a single reaction vessel, or polymerization may be carried out in plural reaction vessels different in polymerization conditions, which are connected in series. The present invention can be applied, when hydrogen concentration in the subsequent stage is lowered efficiently as compared with the precedent stage in a single reaction vessel, or in order to efficiently lower hydrogen flowing with powders from the precedent stage reaction vessel into the subsequent stage reaction vessel in a multistage polymerization using plural reaction vessels.

Therefore, in the process for producing an olefin polymer of the present invention, as long as an olefin can be polymerized in the presence of a gas phase containing hydrogen, a single stage polymerization using single polymerization conditions may be carried out or a multistage polymerization consisting of plural polymerization steps different in polymerization conditions may be carried out, and polymerization may be carried out by use of a single reaction vessel or polymerization may be carried out by use of plural reaction vessels. Herein, polymerization conditions mean polymerization form, temperature, pressure, raw material composition, and the like, and polymerization form means liquid phase polymerization or gas phase polymerization. When a multistage polymerization is used, in a stage prior to the polymerization step wherein a hydrogenation catalyst is added, liquid phase polymerization or gas phase polymerization may be carried out. Liquid phase polymerization means bulk polymerization or slurry polymerization, and gas phase polymerization means mixing vessel type gas phase polymerization, fluidized bed type gas phase polymerization, or entrained bed type gas phase polymerization. As the gas phase polymerization in the present invention, preferable is a fluidized bed type one wherein a gas is flown vertically and upwardly in a cylindrical reaction vessel provided with a gas-dispersing board.

The addition place of a hydrogenation catalyst in a fluidized bed type gas phase polymerization is preferably within a bed portion formed just above a dispersing board, from the standpoint of mixing a polymer and a hydrogenation catalyst sufficiently and increasing hydrogenation performance. When the height of a dispersing board is presumed as 0 and the height of a bed portion is presumed as H, a hydrogenation catalyst is preferably added to a portion having a height of 0 to 0.5H and most preferably added to a portion having a height of 0 to 0.3H.

It is preferable that the hydrogenation catalyst used in the present invention is added to a bed portion. The bed portion means a powder-concentrated portion having a bulk density of polymerized powder of not less than 0.10 g/cc in a gas phase reaction vessel. In the present invention, preferably a hydrogenation catalyst is added to a bed portion having a bulk density of polymerized powder of not less than 0.13 g/cc and not more than 0.70 g/cc, and more preferably a hydrogenation catalyst is added to a bed portion having a bulk density of polymerized powder of not less than 0.16 g/cc and not more than 0.50 g/cc.

With regard to the amount of a hydrogenation catalyst charged, the molar amount of a metal atom in a hydrogenation catalyst to 1 kg of polymerized powders in a reaction vessel (mmol/kg) is preferably not less than 0.0001 mmol/kg and not more than 1 mmol/kg, more preferably not less than 0.0003 mmol/kg and not more than 0.5 mmol/kg, and most preferably not less than 0.001 mmol/kg and not more than 0.1 mmol/kg.

In addition, a hydrogenation catalyst may be charged continuously or intermittently into a reaction vessel.

[Main Polymerization]

In the process for producing an olefin polymer of the present invention, an olefin polymer produced in a gas phase reaction vessel may be a homopolymer or a copolymer. As examples of an olefin to be polymerized in the present invention, there can be shown ethylene, propylene, 1-butene, 1-pentene, 1-hexene, 1-octene, 1-decene, 4-methyl-1-pentene, 3-methyl-1-pentene, styrene, butadiene, isoprene, 1,4-hexadiene, dicyclopentadiene, 5-ethylidene-2-norbornene, and the like, and the olefin is determined depending on the kind of the desired polymer product. That is, when, for example, polyethylene, polypropylene, polybutene and the like are produced as a homopolymer product, and EPR (ethylene-propylene copolymer), PBR (propylene-butene copolymer), EPBR (ethylene-propylene-butene copolymer) and the like are produced as a copolymer product, olefins to be used in polymerization steps are ethylene, propylene, and butene, and in some cases an extremely small amount of the other olefins are used.

In the case of multistage polymerization, the same polymer may be produced in each stage, or polymers different in compositions may be produced. In case the same polymer is produced in each stage, a hydrogen content in the subsequent stage gas phase reactor can be decreased by adding a hydrogenation catalyst into a bed portion of the subsequent stage gas phase reactor, and thus an olefin polymer having a broad molecular weight distribution, in which a polymer produced in the subsequent stage has a molecular weight higher than that of a polymer produced in the precedent stage, can be produced. Additionally, in case polymers different in compositions are produced in each stage, the present invention can be used in the production of an olefin polymer which contains a polymer having a lower molecular weight produced in the precedent stage and a polymer having a higher molecular weight produced in the subsequent stage and having a composition different from that of the precedent stage.

The process for producing an olefin polymer of the present invention is preferably a process for producing an ethylene-propylene block copolymer comprising a first polymerization step of polymerizing propylene in the presence of hydrogen and a catalyst for olefin polymerization to obtain a propylene homopolymer and a second polymerization step of polymerizing ethylene and propylene in the presence of the propylene homopolymer obtained in the first polymerization step to obtain an ethylene-propylene copolymer, wherein second polymerization step further comprises the steps of using a gas phase reaction vessel, adding a hydrogenation catalyst into the gas phase reaction vessel, and adding a polymerization activity depressant.

In the above process for producing an ethylene-propylene block copolymer, the ratio of the limiting viscosity of the propylene homopolymer obtained in the first polymerization step to the limiting viscosity of the ethylene-propylene copolymer obtained in the second polymerization step is preferably 2 to 20, more preferably 2.5 to 15, and further preferably 3.5 to 10.

The first polymerization step and/or the second polymerization step may be a single-stage polymerization step or a multistage polymerization step.

Polymerization temperature is different depending on the kind of a monomer, the molecular weight of a product, and the like, but is not more than the melting point of an olefin polymer, preferably lower by 10° C. or more than the melting point, more preferably room temperature to 200° C., specially preferably 40 to 160° C., and most preferably 60 to 130° C. Furthermore, in order to maintain polymerization temperature within this range, the polymerization system is cooled by a cooling apparatus. In addition, polymerization pressure is atmospheric pressure to 15 MPa, preferably 0.2 to 7 MPa, and most preferably 1 to 5 MPa.

When the present invention is applied to a multistage polymerization, it is preferable to maintain the hydrogen concentration of a gas phase portion in the precedent stage at the condition not more than 30%. Even if the hydrogen concentration is high enough to exceed 30%, there is no particular problem in carrying out the production process of the present invention, but a large amount of hydrogen introduced into the subsequent stage increases the concentration of the olefin hydride (propane, ethane, or the like) produced in a gas phase reaction vessel and lowers polymerization activity in the subsequent stage, and hence it is not preferable that the hydrogen concentration is too high.

[Prepolymerization]

Before polymerization step a small amount of an olefin may be polymerized (hereinafter referred to as prepolymerization) to form a prepolymerization catalyst component. As examples of an olefin to be prepolymerized, there can be shown ethylene, propylene, 1-butene, 1-pentene, 1-hexene, 1-octene, 1-decene, 4-methyl-1-pentene, 3-methyl-1-pentene, styrene, butadiene, isoprene, 1,4-hexadiene, dicyclopentadiene, 5-ethylidene-2-norbornene, and the like. The amount of an olefin to be prepolymerized is usually 0.1 to 200 g per g of the catalyst component. As a method for the prepolymerization, there are cited publicly known methods such as a method of feeding a small amount of an olefin in the presence of the catalyst component and an organic aluminum compound and carrying out prepolymerization in slurry state by use of a solvent. As a solvent used in prepolymerization, there are cited inert hydrocarbons such as propane, butane, isobutane, pentane, isopentane, hexane, heptane, octane, cyclohexane, benzene, toluene and the like, and liquid olefins, and they may be used in a mixture of two or more kinds. In addition, slurry concentration in prepolymerization is usually 1 to 500 g and preferably 3 to 150 g as the weight of catalyst component contained in 1 L of a solvent.

The amount of an organic aluminum compound used in prepolymerization is 0.1 to 700 moles per mole of a transition metal atom contained in the catalyst component, preferably 0.2 to 200 moles, and more preferably 0.2 to 100 moles. In prepolymerization, an electron donor such as an alkoxysilicon compound or the like may be present as needed. The amount of an electron donor used is preferably 0.01 to 400 moles per mole of a transition metal atom contained in the catalyst component, more preferably 0.02 to 200 moles, further more preferably 0.03 to 100 moles.

Prepolymerization temperature is usually −20 to +100° C. and preferably 0 to +80° C. In addition, prepolymerization time is usually 2 minutes to 15 hours.

EXAMPLES

Hereinafter, the present invention is explained by way of Examples and Comparative Examples. Measurements and evaluations of physical properties were carried out by the undermentioned methods.
(1) Limiting Viscosity (unit: dl/g)

By use of Ubbelohde viscometer, reduced viscosities were measured at three concentrations of 0.1, 0.2 and 0.5 g/dl under the conditions of tetralin solvent and temperature: 135° C. Subsequently, limiting viscosity was obtained by extrapolation method of plotting the reduced viscosities to the concentrations and extrapolating the concentrations to zero, in accordance with the calculation method disclosed in "Polymer Solution, Polymer Experimental Study 11" (published by Kyoritsu Shuppan Co., Ltd. in 1982), page 491.
(2) Copolymerized Portion Content (unit: weight %)

The copolymerized portion content X (weight %) produced in the first stage copolymerization step was calculated by the undermentioned formula.

$$X = (Pb - Pa)/Pb \times 100$$

Pa: Polymer weight per hour discharged from the third stage propylene polymerization step
Pb: Polymer weight per hour discharged from the first stage copolymerization step (3) Limiting Viscosity (unit: dl/g) of Polymer Produced in Copolymerized Portion Limiting viscosity [η]a (dl/g) of the polymer component produced in the third stage propylene polymerization step, and limiting viscosity [η]b (dl/g) of the polymer component produced in the first stage copolymerization step were calculated by the undermentioned formulas.

$$[\eta]a = [\eta]1$$

$$[\eta]b = ([\eta]2 - [\eta]a \times (1 - X/100)) / (X/100)$$

[η]1: Limiting viscosity (dl/g) of the polymer after the third stage propylene polymerization step
[η]2: Limiting viscosity (dl/g) of the polymer after the first stage copolymerization step (4) Bulk Density (unit: g/cc)

The bulk density (g/cc) of powders was measured in accordance with JIS K-6721 (1966).

(5) Proportion of Agglomerates (ppm)

The proportion Y (ppm) of agglomerates was calculated in accordance with the undermentioned formula.

$$Y = (Y1/Y2) \times 10^6$$

Y1: when powders are riddled with the sieve (aperture: 2 mm) of JIS Z-8801, the weight (g) of powders left on the sieve.
Y2: the weight (g) of powders riddled as mentioned above.

Example 1

[Preparation of Titanocene Compound Solution]

The inside of a flask having 1 L inner volume was replaced with nitrogen. Into this vessel 4.5 g of dicyclopentadienyltitanium dichloride (manufactured by KANTO CHEMICAL CO., INC.) and 928 mL of hexane were charged and at the same time stirred at room temperature, and 72 millimoles of triethyl aluminum was charged to obtain a solution. This solution was further diluted with hexane.

[Prepolymerization]

Into an autoclave made of SUS having 3 L inner volume and fitted with a stirrer, 1.5 L of n-hexane sufficiently subjected to dehydration and degasification treatments, 30 millimoles of triethyl aluminum, and 3.0 millimoles of cyclohexylethyldimethoxysilane were charged. Therein 16 g of a solid catalyst component, which was prepared by a method same as that of Example 1 of Japanese patent application No. 2008-277945, was added, 32 g of propylene was continuously fed in about 40 minutes while keeping the temperature in the autoclave at about 3 to 10° C., and prepolymerization was carried out. Subsequently, the prepolymerized slurry was transferred to an autoclave made of SUS having 200 L inner volume and fitted with a stirrer, and 132 L of liquid butane was added to form a prepolymerization catalyst component slurry.

By use of the prepolymerization catalyst component slurry prepared as mentioned above, three stage propylene homopolymerizations were carried out respectively in different reactors to produce polypropylene particles. Subsequently, in the presence of the polypropylene particles, one stage copolymerization of propylene and ethylene was carried out to produce a propylene-ethylene block copolymer. Hereinafter, each polymerization stage is explained.

[The First Stage Propylene Polymerization (Liquid Phase Polymerization Reaction)]

By use of a Bessel type reactor having 163 L inner volume and fitted with a stirrer, homopolymerization of propylene was carried out. That is, propylene, hydrogen, triethyl aluminum, cyclohexylethyldimethoxysilane, and the prepolymerization catalyst component slurry were continuously fed in the reactor. The reaction conditions were polymerization temperature: 73° C., stirring velocity: 150 rpm, liquid level of the reactor: 44 L, feed rate of propylene: 25 kg/hour, feed rate of hydrogen: 160 NL/hour, feed rate of triethyl aluminum: 40.6 millimoles/hour, feed rate of cyclohexylethyldimethoxysilane: 5.9 millimoles/hour, and feed rate of the prepolymerization catalyst component slurry (calculated in terms of the polymerization catalyst component): 0.445 g/hour. In the reactor the average residence time of the slurry was 0.73 hour, and the amount of polypropylene particles discharged was 5.0 kg/hour.

[The Second Stage Propylene Polymerization (Liquid Phase Polymerization Reaction)]

The slurry, which had undergone the above first propylene polymerization, was continuously transferred to another reactor (Bessel type), and homopolymerization of propylene was further carried out. In this connection, feeding of propylene and hydrogen to the reactor was not carried out. The reaction conditions were polymerization temperature: 69° C., stirring velocity: 150 rpm, and liquid level of the reactor: 44 L. In the reactor the average residence time of the slurry was 0.84 hour, and the amount of polypropylene particles discharged was 9.3 kg/hour.

[The Third Stage Propylene Polymerization (Gas Phase Polymerization Reaction)]

The polypropylene particles obtained through the above second propylene polymerization were continuously transferred to a fluidized bed reactor having 1.4 m³ inner volume and fitted with a stirrer, propylene and hydrogen were continuously fed to this reactor, and homopolymerization of propylene was further carried out, while purging the excess gas so as to keep the pressure constant. Reaction conditions were polymerization temperature: 80° C., polymerization pressure: 1.8 MPa, circulating gas flow rate: 100 m³/hour, feed rate of propylene: 10 kg/hour, feed rate of hydrogen: 930 NL/hour, and polymer particle hold amount in the fluidized bed: 50 kg. In the reactor the average residence time of polymer particles was 3.5 hour, the gas concentration ratio (mole %) of hydrogen/(hydrogen+propylene) in the reactor was 8.9, the amount of polymer particles discharged was 14.1 kg/hour, and the limiting viscosity thereof was 0.97 dl/g.

[The First Stage Copolymerization (Gas Phase Polymerization Reaction)]

The polypropylene particles obtained through the above third propylene polymerization were continuously transferred to another fluidized bed reactor having 1 m³ inner volume and fitted with a gas-dispersing board and a stirrer; propylene, ethylene, and hydrogen were continuously fed to this reactor; and copolymerization of propylene and ethylene was carried out, while purging the excess gas so as to keep the pressure constant. Reaction conditions were polymerization temperature: 70° C., polymerization pressure: 1.4 MPa, circulating gas flow rate: 150 m³/hour, feed rate of propylene: 22.5 kg/hour, feed rate of ethylene: 8.3 kg/hour, feed rate of hydrogen: 200 NL/hour, and polymer particle hold amount in the fluidized bed: 55 kg. Furthermore, to the bed portion was added the above-mentioned titanocene compound solution in an amount corresponding to 2.56 millimoles calculated in terms of titanocene molecular weight per mole of triethyl aluminum fed to the first stage propylene polymerization reactor. A bulk density of polymerized powder in a bed portion was 0.303 g/cc. Moreover, to the reactor was added, as a polymerization activity depressant, oxygen in an amount corresponding to 4.2 millimoles calculated in terms of oxygen molecular weight per mole of triethyl aluminum fed to the first stage propylene polymerization reactor. In the reactor the average residence time of polymer particles was 2.9 hour; as the gas concentration ratio (mole %) in the reactor, ethylene/(propylene+ethylene) was 27, and hydrogen/(hydrogen+propylene+ethylene) was 0.59; the amount of polymer particles discharged was 19.1 kg/hour;

the bulk density of powders was 0.452 g/cc; and the proportion of agglomerates was 1110 ppm.

Example 2

Except adding ethanol as a polymerization activity depressant in place of oxygen in an amount corresponding to 0.79 mole calculated in terms of ethanol molecular weight per mole of triethyl aluminum fed to the first stage propylene polymerization reactor to the reactor, gas feed rates were adjusted so as to give the same gas concentration ratios (mole %) in the copolymerized portion reactor as in Example 1, and the copolymerized portion hold amount was adjusted so as to give the same copolymerized portion content as in Example 1. Then, a bulk density of polymerized powder was 0.310 g/cc. In the reactor, hydrogen feed rate was 270 NL/H. The bulk density of powders was 0.464 g/cc and the proportion of agglomerates was 803 ppm.

Comparative Example 1

Except not adding oxygen, gas feed rates were adjusted so as to give the same gas concentration ratios (mole %) in the copolymerized portion reactor as in Example 1, and the copolymerized portion hold amount was adjusted so as to give the same copolymerized portion content as in Example 1. In the reactor hydrogen feed rate was 433 NL/H, and so sufficient proceeding of hydrogenation reaction was recognized, but the bulk density of powders was 0.394 g/cc and the proportion of agglomerates was 34775 ppm, and so powder properties were deteriorated.

Comparative Example 2

Except not charging the titanocene compound solution and oxygen, gas feed rates were adjusted so as to give the same gas concentration ratios (mole %) in the copolymerized portion reactor as in Example 1, and the copolymerized portion hold amount was adjusted so as to give the same copolymerized portion content as in Example 1. In the reactor hydrogen feed rate was 22 NL/H, and so proceeding of hydrogenation reaction was not recognized, and the bulk density of powders was 0.449 g/cc and the proportion of agglomerates was 1173 ppm, and so powder properties were good.

The invention claimed is:

1. A process for producing an olefin polymer comprising the steps of:
   feeding olefin monomer to a gas phase reaction vessel;
   polymerizing the olefin in the presence of a catalyst for olefin polymerization in the presence of hydrogen;
   adding a hydrogenation catalyst into the gas phase reaction vessel; and
   adding a polymerization activity depressant;
   wherein the hydrogenation catalyst is added to a bed portion in the gas phase reaction vessel, the bed portion is a powder-concentrated portion having a bulk density of polymerized powder of not less than 0.10 g/cc in the gas phase reaction vessel, and
   the addition place of the hydrogenation catalyst in a fluidized bed type gas phase polymerization is within a bed portion formed just above a dispersing board and the hydrogenation catalyst is added to a portion having a height of from greater than 0 to 0.5H when the height of a dispersing board is presumed as 0 and the height of a bed portion is presumed as H.

2. The process for producing an olefin polymer according to claim 1, wherein the polymerization activity depressant is an active hydrogen-containing compound or an oxygen-containing compound gaseous at normal temperatures and normal pressures or an active hydrogen compound.

3. The process for producing an olefin polymer according to claim 1, wherein the hydrogenation catalyst is added to a bed portion having a bulk density of polymerized powder of not less than 0.13 g/cc and not more than 0.70 g/cc.

4. The process for producing an olefin polymer according to claim 2, wherein the hydrogenation catalyst is added to a bed portion having a bulk density of polymerized powder of not less than 0.13 g/cc and not more than 0.70 g/cc.

5. The process for producing an olefin polymer according to claim 1, wherein the hydrogenation catalyst is added to a bed portion having a bulk density of polymerized powder of not less than 0.16 g/cc and not more than 0.50 g/cc.

6. The process for producing an olefin polymer according to claim 2, wherein the hydrogenation catalyst is added to a bed portion having a bulk density of polymerized powder of not less than 0.16 g/cc and not more than 0.50 g/cc.

7. The process for producing an olefin polymer according to claim 1, wherein the hydrogenation catalyst is added to a portion having a height of from greater than 0 to 0.3H.

8. The process for producing an olefin polymer according to claim 2, wherein the hydrogenation catalyst is added to a portion having a height of from greater than 0 to 0.3H.

* * * * *